US008775237B2

(12) United States Patent
Nickerson et al.

(10) Patent No.: US 8,775,237 B2
(45) Date of Patent: Jul. 8, 2014

(54) SYSTEM AND METHOD FOR MEASURING AND REPORTING USER REACTIONS TO ADVERTISEMENTS ON A WEB PAGE

(75) Inventors: Rand B. Nickerson, Highland Park, IL (US); Mark A. Treschl, Highland Park, IL (US); Charles H. Williams, Jr., Gurnee, IL (US); Sebastien J. Arnaud, Auburn, AL (US); Kennith G. Hunter, Wheeling, IL (US)

(73) Assignee: OpinionLab, Inc., Highland Park, IL (US)

( * ) Notice: Subject to any disclaimer, the term of this patent is extended or adjusted under 35 U.S.C. 154(b) by 1612 days.

(21) Appl. No.: 11/832,747

(22) Filed: Aug. 2, 2007

(65) Prior Publication Data

US 2008/0033790 A1    Feb. 7, 2008

Related U.S. Application Data

(60) Provisional application No. 60/821,232, filed on Aug. 2, 2006.

(51) Int. Cl.
*G06Q 40/00* (2012.01)

(52) U.S. Cl.
USPC .......................................................... 705/14

(58) Field of Classification Search
None
See application file for complete search history.

(56) References Cited

U.S. PATENT DOCUMENTS

| 4,283,723 A * | 8/1981 | Bickley et al. ............. 345/440.2 |
| 5,537,618 A | 7/1996 | Boulton et al. ................ 395/161 |
| 5,568,489 A | 10/1996 | Yien et al. .................. 370/110.1 |
| 5,678,041 A | 10/1997 | Baker et al. .................... 395/609 |
| 5,706,507 A | 1/1998 | Schloss .......................... 395/615 |
| 5,727,950 A | 3/1998 | Cook ............................... 434/350 |
| 5,754,939 A | 5/1998 | Herz et al. ...................... 455/4.2 |
| 5,761,683 A | 6/1998 | Logan et al. .................. 707/513 |
| 5,778,182 A | 7/1998 | Cathey et al. ............ 395/200.49 |

(Continued)

FOREIGN PATENT DOCUMENTS

| CA | 2 490 828 | 2/2004 | .............. H04L 12/16 |
| WO | WO 99/59096 | 11/1999 | .............. G06F 17/60 |

(Continued)

OTHER PUBLICATIONS

Gupta et al.; DOM-based Content Extraction of HTML Documents; WWW'03 Proceedings of the 12th International Conference on World Wide Web; pp. 207-214; (2003).*

(Continued)

*Primary Examiner* — Virpi Kanervo
(74) *Attorney, Agent, or Firm* — Baker Botts L.L.P.

(57) ABSTRACT

In one embodiment, a system comprises a first element viewable on a web page on or near an advertisement and soliciting user reactions concerning the advertisement; and a second element displayed in response to selection of the first element, soliciting one or more user reactions concerning the advertisement, and displaying the advertisement or a substantial duplicate thereof. In one embodiment, a method comprises collecting user reactions concerning an advertisement on a web page and presenting a report of the reactions comprising a bar graph with each bar representing a characteristic of the advertisement. In one embodiment, a method comprises collecting user reactions concerning advertisements included on web pages and presenting a report of the reactions comprising a graph including multiple icons, each representing an advertisement; an axis corresponding to a quantity of reactions; and an axis corresponding to ratings associated with the reactions for characteristics of the advertisements.

20 Claims, 16 Drawing Sheets

(56) References Cited

U.S. PATENT DOCUMENTS

| | | | |
|---|---|---|---|
| 5,804,803 A | 9/1998 | Cragun et al. ............... 235/375 |
| 5,809,247 A | 9/1998 | Richardson et al. ..... 395/200.48 |
| 5,862,223 A | 1/1999 | Walker et al. .................... 380/25 |
| 5,862,260 A | 1/1999 | Rhoads ......................... 382/232 |
| 5,862,325 A | 1/1999 | Reed et al. ............... 395/200.31 |
| 5,870,744 A | 2/1999 | Sprague ............................ 707/9 |
| 5,872,850 A | 2/1999 | Klein et al. ..................... 380/49 |
| 5,958,008 A | 9/1999 | Pogrebisky et al. .......... 709/223 |
| 5,973,683 A | 10/1999 | Cragun et al. ................ 345/327 |
| 5,974,572 A | 10/1999 | Weinberg et al. .............. 714/47 |
| 5,991,735 A | 11/1999 | Gerace ............................ 705/10 |
| 6,029,171 A | 2/2000 | Smiga et al. ................. 707/102 |
| 6,035,330 A | 3/2000 | Astiz et al. .................... 709/208 |
| 6,134,531 A | 10/2000 | Trewitt et al. .................. 705/10 |
| 6,141,010 A | 10/2000 | Hoyle ............................ 345/356 |
| 6,161,112 A | 12/2000 | Cragun et al. ................ 707/501 |
| 6,189,029 B1 | 2/2001 | Fuerst ............................ 709/217 |
| 6,236,975 B1 | 5/2001 | Boe et al. .......................... 705/7 |
| 6,243,722 B1 | 6/2001 | Day et al. ...................... 707/512 |
| 6,260,064 B1 | 7/2001 | Kurzrok ......................... 709/224 |
| 6,297,819 B1 | 10/2001 | Furst .............................. 345/329 |
| 6,385,590 B1 | 5/2002 | Levine ............................ 705/10 |
| 6,389,538 B1 | 5/2002 | Gruse et al. ................... 713/194 |
| 6,393,479 B1 | 5/2002 | Glommen et al. ............ 709/224 |
| 6,421,724 B1 * | 7/2002 | Nickerson et al. ............ 709/224 |
| 6,434,556 B1 | 8/2002 | Levin et al. ....................... 707/5 |
| 6,449,632 B1 | 9/2002 | David et al. ................... 709/202 |
| 6,460,036 B1 | 10/2002 | Herz ............................... 707/10 |
| 6,477,504 B1 | 11/2002 | Hamlin et al. .................. 705/10 |
| 6,480,852 B1 | 11/2002 | Himmel et al. ................ 707/10 |
| 6,510,427 B1 | 1/2003 | Bossemeyer, Jr. et al. ....... 707/6 |
| 6,578,014 B1 | 6/2003 | Murcko, Jr. ..................... 705/26 |
| 6,606,581 B1 | 8/2003 | Crofoot et al. ................ 702/186 |
| 6,606,657 B1 | 8/2003 | Zilberstein et al. ........... 709/224 |
| 6,606,659 B1 | 8/2003 | Hegli et al. ................... 709/225 |
| 6,618,717 B1 | 9/2003 | Karadimitriou et al. ........ 706/61 |
| 6,631,184 B1 | 10/2003 | Weiner ....................... 379/92.01 |
| 6,681,247 B1 | 1/2004 | Payton .......................... 709/217 |
| 6,748,449 B1 | 6/2004 | Dutta ............................ 709/245 |
| 6,766,481 B2 | 7/2004 | Estep et al. ................... 714/124 |
| 6,772,139 B1 | 8/2004 | Smith, III ......................... 707/3 |
| 6,792,458 B1 | 9/2004 | Muret et al. .................. 709/224 |
| 6,819,336 B1 | 11/2004 | Nielsen ......................... 345/711 |
| 6,859,784 B1 | 2/2005 | van Duyne et al. ............ 705/10 |
| 6,895,437 B1 | 5/2005 | Cowdrey et al. .............. 709/224 |
| 6,928,392 B2 | 8/2005 | Nickerson et al. ............ 702/186 |
| 6,938,202 B1 | 8/2005 | Matsubayashi et al. |
| 7,024,691 B1 | 4/2006 | Herzberg et al. ................. 726/5 |
| 7,181,696 B2 | 2/2007 | Brock ........................... 715/758 |
| 7,370,285 B1 | 5/2008 | Nickerson et al. |
| 7,478,121 B1 | 1/2009 | Nickerson et al. |
| 2001/0047290 A1 | 11/2001 | Petras et al. ..................... 705/10 |
| 2002/0046118 A1 * | 4/2002 | Minte ............................ 705/14 |
| 2002/0049713 A1 | 4/2002 | Khemlani et al. .............. 707/1 |
| 2002/0065802 A1 | 5/2002 | Uchiyama ....................... 707/1 |
| 2002/0072955 A1 | 6/2002 | Brock ............................ 705/10 |
| 2002/0087526 A1 | 7/2002 | Rao .................................. 707/3 |
| 2002/0087679 A1 | 7/2002 | Pulley et al. .................. 709/224 |
| 2002/0087969 A1 | 7/2002 | Brunheroto et al. ........... 725/13 |
| 2002/0099617 A1 | 7/2002 | Fogelson ....................... 705/26 |
| 2002/0111865 A1 | 8/2002 | Middleton, III et al. ........ 705/14 |
| 2002/0120727 A1 | 8/2002 | Curley et al. ................. 709/223 |
| 2003/0009555 A1 | 1/2003 | Nickerson et al. |
| 2003/0085927 A1 | 5/2003 | Muller .......................... 345/810 |
| 2003/0115023 A1 | 6/2003 | Nickerson et al. ............ 702/188 |
| 2003/0207238 A1 | 11/2003 | Latzina et al. ................ 434/118 |
| 2003/0217034 A1 | 11/2003 | Shutt et al. |
| 2004/0015866 A1 | 1/2004 | Estep et al. ................... 717/124 |
| 2004/0049571 A1 | 3/2004 | Johnson et al. ............... 709/224 |
| 2004/0059625 A1 * | 3/2004 | Schrader ......................... 705/10 |
| 2004/0169654 A1 * | 9/2004 | Walker et al. ................. 345/440 |
| 2004/0201633 A1 | 10/2004 | Barsness et al. |
| 2004/0205065 A1 | 10/2004 | Petras et al. ..................... 707/5 |
| 2005/0108020 A1 | 5/2005 | Lehavi ............................ 705/1 |
| 2005/0192854 A1 | 9/2005 | Ebert et al. ....................... 705/7 |
| 2005/0240618 A1 | 10/2005 | Nickerson et al. ............ 707/102 |
| 2005/0251399 A1 | 11/2005 | Agarwal et al. ................... 705/1 |
| 2005/0251443 A1 * | 11/2005 | Chan et al. ..................... 705/14 |
| 2006/0089880 A1 * | 4/2006 | Merriman et al. .............. 705/14 |
| 2006/0212444 A1 * | 9/2006 | Handman et al. ................ 707/5 |
| 2006/0248188 A1 | 11/2006 | Nickerson et al. ............ 709/224 |
| 2006/0259767 A1 | 11/2006 | Mansz et al. .................. 713/168 |
| 2006/0265368 A1 | 11/2006 | Nickerson et al. ............... 707/5 |
| 2007/0192181 A1 * | 8/2007 | Asdourian ...................... 705/14 |
| 2008/0059286 A1 | 3/2008 | Nickerson et al. ............. 705/10 |
| 2008/0209361 A1 | 8/2008 | Nickerson et al. |

FOREIGN PATENT DOCUMENTS

| | | | |
|---|---|---|---|
| WO | WO 00/62204 | 10/2000 | ............. G06F 17/30 |
| WO | WO 01/16841 | 3/2001 | |
| WO | WO 2004/012044 | 2/2004 | ............... G09G 5/00 |

OTHER PUBLICATIONS

Ward et al.; Physiological Responses to Different WEB Page Designs; Int. J. Human-Computer Studies; vol. 59, pp. 199-212; (2003).*

McCoy et al.; A Study of the Effects of Online Advertising: A Focus on Pop-up and In-Line Ads; (2004).*

Canadian Intellectual Property Office, "Office Action," for Application No. 2,489,322, 5 pages, Nov. 14, 2008.

PCT, Notification of Transmittal of the International Search Report or the Declaration, PCT/US06/18184, 9 pages, mailed Mar. 7, 2008.

European Patent Office, Communication for Application No. 07016965.1-1238, Nov. 7, 2007.

European Patent Office, Decision to Refuse a European Patent Application, Application No. 05252213.3-1238, Nov. 18, 2008, 31 pages.

Nickerson et al., "Computer-Implemented System and Method for Measuring and Reporting Business Intelligence Based on Comments Collected from Web Page Users Software Associated with Accessed Web Pages," U.S. Appl. No. 11/847,676, Aug. 30, 2007.

Nickerson et al., "Receiving and Reporting Page-Specific User Feedback Concerning One or More Particular Web Pages of a Website," U.S. Appl. No. 12/115,442, May 5, 2008.

Vora, P.R., "Designing for the Web: A Survey," design/methods & tools, interjections, pp. 13-30, May-Jun. 1998.

OpinionLab [online], "dna," DIARIST.NET, http://www.diarist.net/active /showthread.php?t=345>, XP002382097, 2 pages, May 8, 2001 Retrieved May 22, 2006.

OpinionLab, "OL™ the leader in automated web feedback solutions," white papers, www.opinionlab.com, pp. 1-70, Printed Jul. 11, 2007.

OpinionLab, "O-Metric Demonstration Tutorial," 6 pages, available prior to Jul. 31, 2001.

OpinionLab, "Best Practices in Collecting Web User Feedback," pp. 1-10, Apr. 2001.

OpinionLab, "OpinionLab's Audit of the Fifty Most Trafficked Websites," pp. 1-4, 2002.

OpinionLab, "Millions of people visit Websites every day. What do they think? It's a simple premise. If you want to know what people think, you have to ask them. (+) white papers," 23 pages, available prior to Jul. 31, 2001.

OpinionLab, "Brochure re: User Experience Optimization," 1 page, available prior to Jul. 31, 2001.

OpinionLab, "Brochure re: Navigating an O-Metric Report," pp. 1-3, available prior to Jul. 31, 2001.

OpinionLab, "The OnlineOpinion System—Different From Other Feedback Techniques," XP002382096, [online], http://web.archive.org/web/20021010024033/www.opinionlab.com/different.asp>, 2 pages, Jul. 23, 2002. Retrieved May 22, 2006.

BizRate.com, Independent Merchant Evaluation, https://eval.bizrate.com/popchoice.pl?id=19383&rb=1&ip=204.194.97.2 &xsum=67748, 1 page; https://eval.bizrate.com/eval_t.pl?id=19383 &ip=204.194.97.2&xsum=67748&g=102, 5 pages, Printed Jun. 13, 2000.

OpinionLab, "Different Versions of the Online Opinion Data Collection Technique Dramatically Impact the Type of Response a Website Receives," White Paper, 5 pages, © 2001.

(56) References Cited

OTHER PUBLICATIONS

Graham, J., "Alternatives to Testing User Experience," [online], Clickz.com, http://www.clickz.com/experts/brand/emkt_strat/print.php/827111, XP002382095, 2 pages, Jul. 31, 2000 Retrieved on May 22, 2006.

Shahabi, C., et al., "Knowledge Discovery from Users Web-Page Navigation," XP010219671, ISBN: 0-8186-7849-6, Research Issues in Data Engineering, 1997 Proceedings, Seventh International Workshop on Birmingham, UK Apr. 7-8, 1997, Los Alamitos, CA, USA, IEEE Computer Society US, pp. 20-29, Apr. 7, 1997.

Watt, J.H., et al., "Using the Internet for Audience and Customer Research," XP010355892, ISBN: 0-7803-579-09-4, Professional Communication Conference 1999, IPCC 99, Communication Jazz: Improvising the New International Communication Culture, Proceedings 1999, IEEE International New Orleans, LA, Piscataway, NJ, USA, IEEE US, pp. 121-130, Sep. 7-10, 1999.

Katerattanakul, P., et al., "Measuring Information Quality of Web Sites: Development of an Instrument," from the 20th International Conference on Information Systems, 7 pages, Jan. 1999.

Tullis, T.S., "A Method for Evaluating Web Page Design Concepts," from CHI 98 Conference Summary on Human Factors in Computing Systems, ACM, ISBN 1-58113-028-7, 2 pages, Apr. 1998.

Faison, T., "Component-Based Development with Visual C#," Online!, XP002333001, Chapter 8, Creating Front Ends with the WebBrowser Component, pp. 1-4, 27, 33, Feb. 2002.

Etgen, M., et al., "What Does Getting WET (Web Event-Logging Tool) Mean for Web Usability?," Proceedings of the 5th Conference on Human Factors & The Web, XP002332999, Jun. 3, 1999.

Blankenbeckler, D., "Browser Support for Active Content," Chapter 25, Xp-002333000, Excerpted from: Morgan, Bryan, "*Visual J++ Unleashed*," Online!, SAMS.NET, Indianapolis, IND., http://web.archive.org/web/20040301061953/http://ww.intel.com/procs/ppro/intro/vrml/mma.wrz, http://docs.rinet.ru/ZhPP/ch25.htm, 11 pages, Retrieved Jun. 21, 2005.

PCT, Notification of Transmittal of International Preliminary Examination Report, PCT/US00/23875, 5 pages, Aug. 22, 2002.

PCT, Notification of Transmittal of the International Search Report or the Declaration, PCT/US 03/23857, 7 pages, Jan. 8, 2004.

PCT, Notification of Transmittal of the International Search Report or the Declaration, PCT/US03/23327, 6 pages, Sep. 7, 2004.

EP, European Search Report—Communication, Application No. EP 05252213.3-1238, 4 pages, Jun. 30, 2005.

EP, Supplemental European Search Report—Communication, Application No. 03771825.1-2205, Patent No. PCT/US0323250, Application No. EP 03771825.1-2205, 3 pages, Jun. 21, 2006.

Nickerson et al., "Measuring a Page-Specific Subjective User Reaction Concerning Each of Multiple Web Pages of a Website," U.S. Appl. No. 10/136,919 (179), May 1, 2002.

Nickerson et al., "Receiving and Reporting Page-Specific User Feedback concerning One or More Particular Web Pages of a Website," U.S. Appl. No. 10/210,609 (181), Jul. 31, 2002.

Nickerson et al., "Receiving and Reporting p.-Specific User Feedback concerning One or More Particular Webe Pages of a Website," U.S. Appl. No. 10/210,256 (182), Jul. 31, 2002.

Nickerson et al., "Soliciting User Feedback regarding One or More Web Pages of a Website without Obscuring Vival Content," U.S. Appl. No. 10/870,024 (192), Jun. 16, 2004.

Nickerson et al., "System and Method for Providing Intelligent Support," U.S. Appl. No. 12/048,136 (262), Mar. 13, 2008.

\* cited by examiner

FIG. 2A

Thank you for taking the time to give us feedback.
We read your responses carefully and use them to make the homepage better.
Your responses are anonymous. Privacy Policy 1. How do you feel about this ad?
◎ Love it
◎ Like it
◎ Feel neutral about it
◎ Dislike it
◎ Hate it 2. Please explain why you feel this way about this ad?

[            ]

3. Which statements best reflect your intention to look into this product?
◎ I am now much more likely to look into this product.
◎ I am somewhat more likely to look into this product.
◎ It did not change my intention to look into this product.
◎ I am somewhat less likely to look into this product.
◎ I am much less likely to look into this product.

4. Did this ad affect your opinion of the advertiser?
◎ Very positively affected my opinion
◎ Somewhat positively affected my opinion
◎ Did not affect my opinion positively or negatively
◎ Somewhat negatively affected my opinion
◎ Very negatively affected my opinion

TO FIG. 2B

FROM FIG. 2A

5. Did this ad affect your opinion of <the website owner>
◎ Very positively affected my opinion
◎ Somewhat positively affected my opinion
◎ Did not affect my opinion positively or negatively
◎ Somewhat negatively affected my opinion
◎ Very negatively affected my opinion 6. Please rate this advertisement in each the following area by using a scale of 1 to 9, where 9="Outstanding or Extraordinary" and 1="Unacceptable or Poor"

|  | Outstanding/ Extraordinary 9 | 8 | 7 | 6 | 5 | 4 | 3 | 2 | Unacceptable/ Poor 1 | NA 0 |
|---|---|---|---|---|---|---|---|---|---|---|
| Relevance of the ad to me. | ◎ | ◎ | ◎ | ◎ | ◎ | ◎ | ◎ | ◎ | ◎ | ◎ |
| Innovativeness of the ad. | ◎ | ◎ | ◎ | ◎ | ◎ | ◎ | ◎ | ◎ | ◎ | ◎ |
| Use of animation in the ad. | ◎ | ◎ | ◎ | ◎ | ◎ | ◎ | ◎ | ◎ | ◎ | ◎ |
| Quality of the graphics within the ad. | ◎ | ◎ | ◎ | ◎ | ◎ | ◎ | ◎ | ◎ | ◎ | ◎ |
| Clarity of the message in the ad. | ◎ | ◎ | ◎ | ◎ | ◎ | ◎ | ◎ | ◎ | ◎ | ◎ |
| My ability to control the ad on the page. | ◎ | ◎ | ◎ | ◎ | ◎ | ◎ | ◎ | ◎ | ◎ | ◎ |
| My ability to navigate the page given the ad. | ◎ | ◎ | ◎ | ◎ | ◎ | ◎ | ◎ | ◎ | ◎ | ◎ |

7. How often do you typically visit the homepage?
◎ Greater than 10 times per day
◎ 5 to 10 times per day
◎ 2 to 4 times per day
◎ About once a day
◎ A few times per week
◎ About once per week
◎ About once a month
◎ Rarely
◎ Never Thank you for your feedback! By clicking the "Submit Survey" button, you will be returned to Submit Survey

*FIG. 2B*

Did the ad show up properly for you?
- Yes
- No
- Not sure

How do you feel about this ad?
- Love it
- Like it
- Feel neutral about it
- Dislike it
- Hate it Please explain why you feel this way about this ad:

[text box] ~32

Did you interact with the ad before coming to this survey?
- Yes
- No
- No, because I didn't realize the ad was clickable
- Don't remember/Not sure Continue >>

NOTICE: We collect personal information on this site. To learn more about how we use your information, see our privacy policy

How interested are you in the product being advertised?
- Very interested
- Interested
- Mildly interested
- Probably not interested
- Not interested at all How much does this ad make you want to use the product being advertised?
- Much more likely to use or investigate the product
- Somewhat more likely to use or investigate the product
- No change or influence
- Somewhat less likely to use or investigate the product
- Much less likely to use or investigate the product Would you like to see ads like this in the future?
- Yes
- No
- Undecided How does this ad affect your opinion of the advertiser?
- Very positively
- Somewhat positively
- No change or influence
- Somewhere negatively
- Very negatively How does this ad affect your opinion of <the website owner>
- Very positively
- Somewhat positively
- No change or influence
- Somewhere negatively
- Very negatively Continue
[OK]

NOTICE: We collect personal information on this site. To learn more about how we use your information. see our privacy policy

Privacy Policy

Thank you for providing feedback on the ad that appears today. Your opinions are very important to us, and your responses are completely confidential.

First, were you able to view the ad?
◉ Yes
◉ No
◉ Don't know

How would you describe your overall opinion of the ad?
◉ Like it a lot
◉ Like it a little
◉ Neither like nor dislike it
◉ Dislike it a little
◉ Dislike a lot When thinking about the ad in comparison to other online ad formats, would you say it is...?
◉ Better than other online ad formats
◉ Neither better nor worse
◉ Worse than other online formats To what extent do you agree or disagree with the following statements:

|  | Strongly Agree | Agree | Neither Agree nor Disagree | Disagree | Strongly Disagree |
|---|---|---|---|---|---|
| The ad was relevant to me personally | ◉ | ◉ | ◉ | ◉ | ◉ |
| The ad was intrusive | ◉ | ◉ | ◉ | ◉ | ◉ |
| The animation or movement of the ad was appealing | ◉ | ◉ | ◉ | ◉ | ◉ |
| The ad takes up too much space on the screen | ◉ | ◉ | ◉ | ◉ | ◉ |
| The images or graphics in the ad were appealing | ◉ | ◉ | ◉ | ◉ | ◉ |
| The ad was confusing | ◉ | ◉ | ◉ | ◉ | ◉ |
| The ad was different than other online ads | ◉ | ◉ | ◉ | ◉ | ◉ |

TO FIG. 4B

FROM FIG. 4A

What do you LIKE MOST about the ad?     42

What do you DISLIKE about the ad?     44

Did you click on the ad?
○ Yes
○ No
○ Don't remember

When thinking about online advertising in general, how satisfied are you with advertising on <this website> versus other Internet sites outside of <this website> (Please exclude pop-ups and spam when thinking about online advertising.)

Are you...
○ More satisfied with advertising on <this website>
○ No difference in satisfaction
○ Less satisfied with advertising on <this website>
○ Don't know And for classification purposes...
Are you a current subscriber?
○ Yes
○ No
○ Don't know Are you...
○ Male
○ Female

[ Submit ]

*FIG. 4B*     40

SYSTEM AND METHOD FOR MEASURING AND REPORTING USER REACTIONS TO ADVERTISEMENTS ON A WEB PAGE

RELATED APPLICATION

This application claims the benefit under 35 U.S.C. §119 (e) of U.S. Provisional Application Ser. No. 60/821,232 filed Aug. 2, 2006.

TECHNICAL FIELD OF THE INVENTION

This invention relates generally to communications and more particularly to a system and method for measuring and reporting user reactions to advertisements on a web page.

BACKGROUND OF THE INVENTION

Many website owners desire information concerning usage of their websites. For example, an Internet website owner might use a third party service to track the number of users that visit its website, the number of "clicks" these users collectively perform (using their mouse pointers) while visiting the website, and how long these users stay at the website. Using this objective information, the website owner may determine that its website is not attracting a sufficient number of users or has been ineffective at keeping the interest of users once they arrive. The website owner may respond accordingly to improve its websites and, possibly, the success of its associated business operations.

Many website owners sell advertisement space on their websites. One approach to selling advertisement space is for a website owner to contract to display one or more advertisements on its website for a certain period of time. Using this approach, the website owner may change the advertisement based on the time of day, based on the other content of the website, or based upon the activities of one or more users. For example, a search website may change the advertisement presented based upon the nature of a user's search query. Some website owners solicit user reactions to the advertisements presented on their web pages. These user reactions can be reviewed and analyzed to determine the effectiveness of the advertisements and the effect that the advertisements have on user reactions to the website or to particular web pages. Because the website owner controls the content of the advertisement, the website owner can correlate the content of the advertisement with any collected user reaction data. However, using existing techniques, these correlations and analyses are slow and relatively ineffective in assisting website owners, advertisers, and media buyers in making decisions regarding these advertisements.

An alternative approach to selling advertisement space is for a website owner to contract to allow an advertiser or a third party to utilize a portion of a web page to display one or more advertisements for a period of time. However, because the website owner does not control the content of the advertisements, absent user comments that indicate the content of the advertisements, current techniques do not allow website owners to correlate user reactions to the website or to particular web pages with the advertising content.

SUMMARY OF THE INVENTION

Particular embodiments of the present invention may reduce or eliminate problems and disadvantages associated with previous techniques for measuring and reporting user reactions to advertisements on a web page.

In one embodiment, a system for measuring user reactions to a particular advertisement on a web page includes a first element that, upon initial display of a web page including a particular advertisement, is viewable on the web page on or near the particular advertisement included on the web page and solicits advertisement-specific user reactions concerning the particular advertisement included on the web page; a second element that is displayed in response to user selection of the first element and solicits one or more advertisement-specific user reactions concerning the particular advertisement included on the web page, the second element displaying the particular advertisement or a substantial duplicate thereof; software associated with the first element operable to receive the user selection of the first element and initiate display of the second element in response; and software associated with the second element operable to receive the advertisement-specific user reactions concerning the particular advertisement included on the web page for reporting to an interested party, the advertisement-specific user reactions allowing the interested party to access one or more components of the advertisement-specific user reactions.

In another embodiment, a method for reporting user reactions to a particular advertisement included on a web page includes collecting advertisement-specific user reactions concerning a particular advertisement included on a web page; and presenting an electronic report of the advertisement-specific user reactions concerning the particular advertisement included on the web page, the electronic report including a color-coded bar graph including a plurality of color coded bars, each bar representing a particular characteristic of the particular advertisement included on the web page, each color within a bar representing a particular rating associated with the user reactions for that particular characteristic.

In another embodiment, a method for reporting user-reactions to a plurality of advertisements included on one or more web pages includes collecting advertisement-specific user reactions concerning a plurality of advertisements included on one or more web pages, the advertisement-specific user reactions concerning at least one characteristic of the plurality of advertisements; and presenting an electronic report for advertisement-specific user reactions concerning the at least one characteristic of the plurality of advertisements included on the one or more web pages, the electronic report including a multi-dimensional graph. The multi-dimensional graph including a plurality of icons, each icon representing a particular advertisement within the plurality of advertisements; a first axis corresponding to a quantity of the user reactions associated with each of the plurality of advertisements; and a second axis corresponding to ratings associated with user reactions for the at least one characteristic of the plurality of advertisements.

Particular embodiments of the present invention may provide one or more technical advantages related to the customer experience, the scope of the user reactions, and the utility of the data collected. For example, certain embodiments may provide a consistent look and feel for the customer and may also provide a more seamless and unambiguous customer experience. As another example, certain embodiments may provide the ability to track user reactions to advertisements placed on particular web pages, throughout a website (i.e., on a plurality of its particular web pages), or across multiple websites or e-commerce properties. As another example, certain embodiments may provide new data sources for advertisement agencies and media buyers to optimize advertisement placement in substantially real-time. As another example, certain embodiments may broaden the participation of customers, increasing the validity of opt-in data collection. As another example, certain embodiments may provide for the collection of supplemental data, useful in assessing the impact of individual advertisements or advertisement layouts on customer perceptions of a website or particular web pages. As another example, certain embodiments may be utilized to supplement, fine tune, and/or replace existing market and/or advertising research techniques and services.

Particular embodiments of the present invention may provide one or more technical advantages related to monitoring, evaluating, and utilizing user reactions. For example, certain embodiments may provide for a more efficient and timely assessment of the impact of certain advertisements. As another example, certain embodiments may provide for substantially real-time information allowing for more efficient and timely responses to such user reactions. As another example, certain embodiments may provide for data integration between user reactions to specific advertisements and user reactions to websites or particular web pages hosting those advertisements. As another example, certain embodiments may increase the availability of user reaction data and may provide for more comprehensible user reaction reporting. As another example, certain embodiments may provide substantially real-time reporting, diagnostic tools, and automated alerts.

Particular embodiments of the present invention may provide tools to enable real-time online advertisement management for advertisers and website owners. For example, certain embodiments may provide tools to enable advertisers to evaluate the performance of an advertisement in substantially real-time.

Certain embodiments may provide all, some, or none of these technical advantages. Certain embodiments may provide one or more other technical advantages, one or more of which may be readily apparent to those skilled in the art from the figures, descriptions, and claims included herein.

BRIEF DESCRIPTION OF THE DRAWINGS

FIGS. 2A-2B, 3A-3C, and 4 illustrate example user feedback forms;

DESCRIPTION OF EXAMPLE EMBODIMENTS

Figure 1:
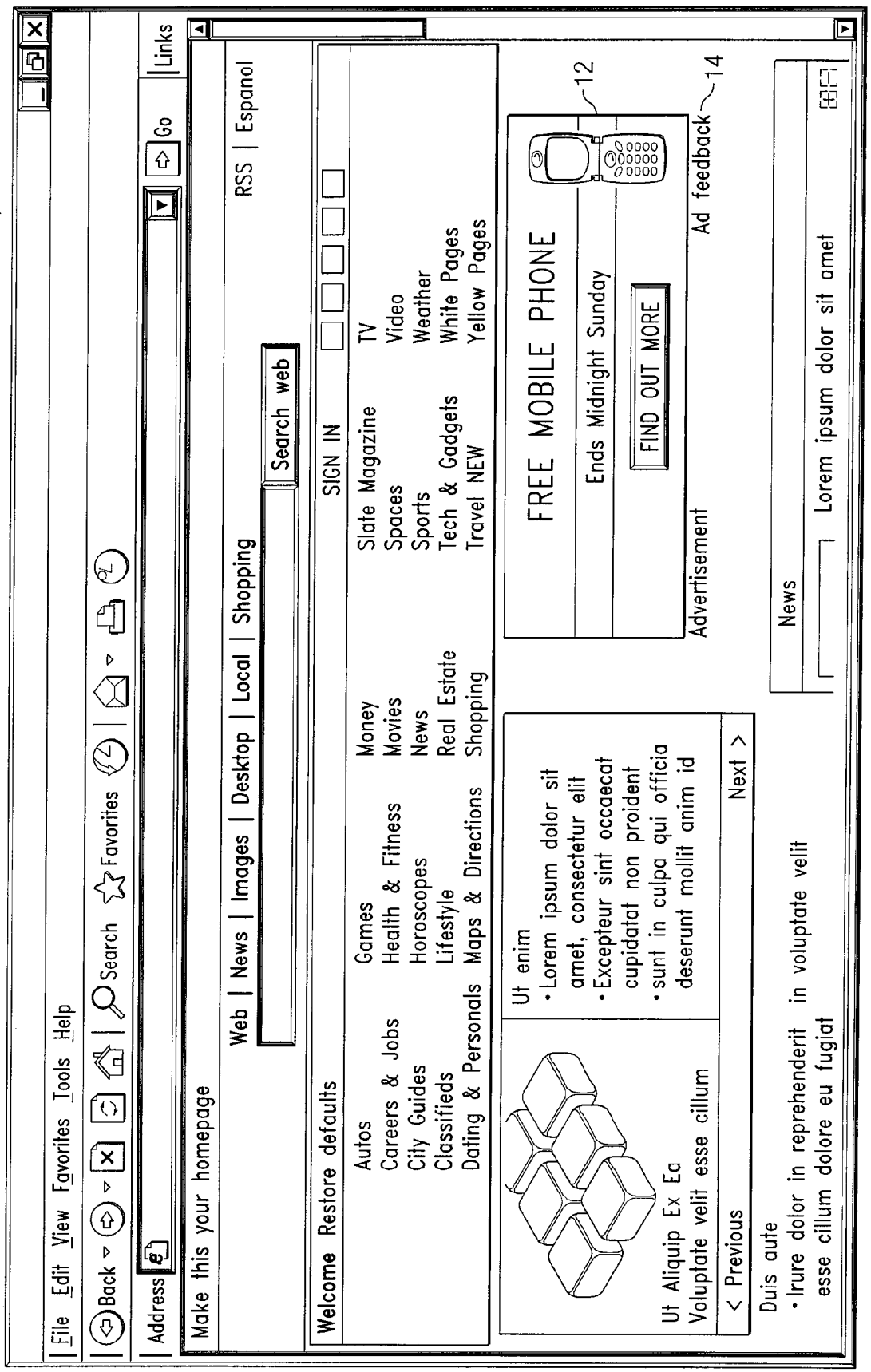
FIG. 1 illustrates an example web page displaying an example online advertisement and an example icon soliciting user feedback.

FIG. 1 illustrates an example web page 10 displaying an example online advertisement 12 and an example icon 14 soliciting user feedback for advertisement 12. According to existing methods, such user feedback can only be correlated with the associated advertisement 12 if the website owner has control over advertisement content such that it knows which advertisement or advertisements are included on web page 10 during the particular time period in which such user feedback was received.

FIGS. 2A-2B, 3A-3C, and 4 illustrate examples of existing user feedback forms presented in response to a user selecting icon 14 soliciting user feedback. Existing forms typically open in a separate window which completely covers the window displaying advertisement 12, or open in the same window, replacing web page 10 that includes advertisement 12. With both of these techniques, users can no longer see advertisement 12 while they are interacting with the form.

The example feedback form 20 shown in FIGS. 2A-2B includes seven questions, with question number six having seven sub-parts. Most users are required to scroll down to see all of the questions in form 20. For most of the questions on form 20, the user is required to read both the question and at least a few of the answers in order to properly respond to the question.

Figure 3C:
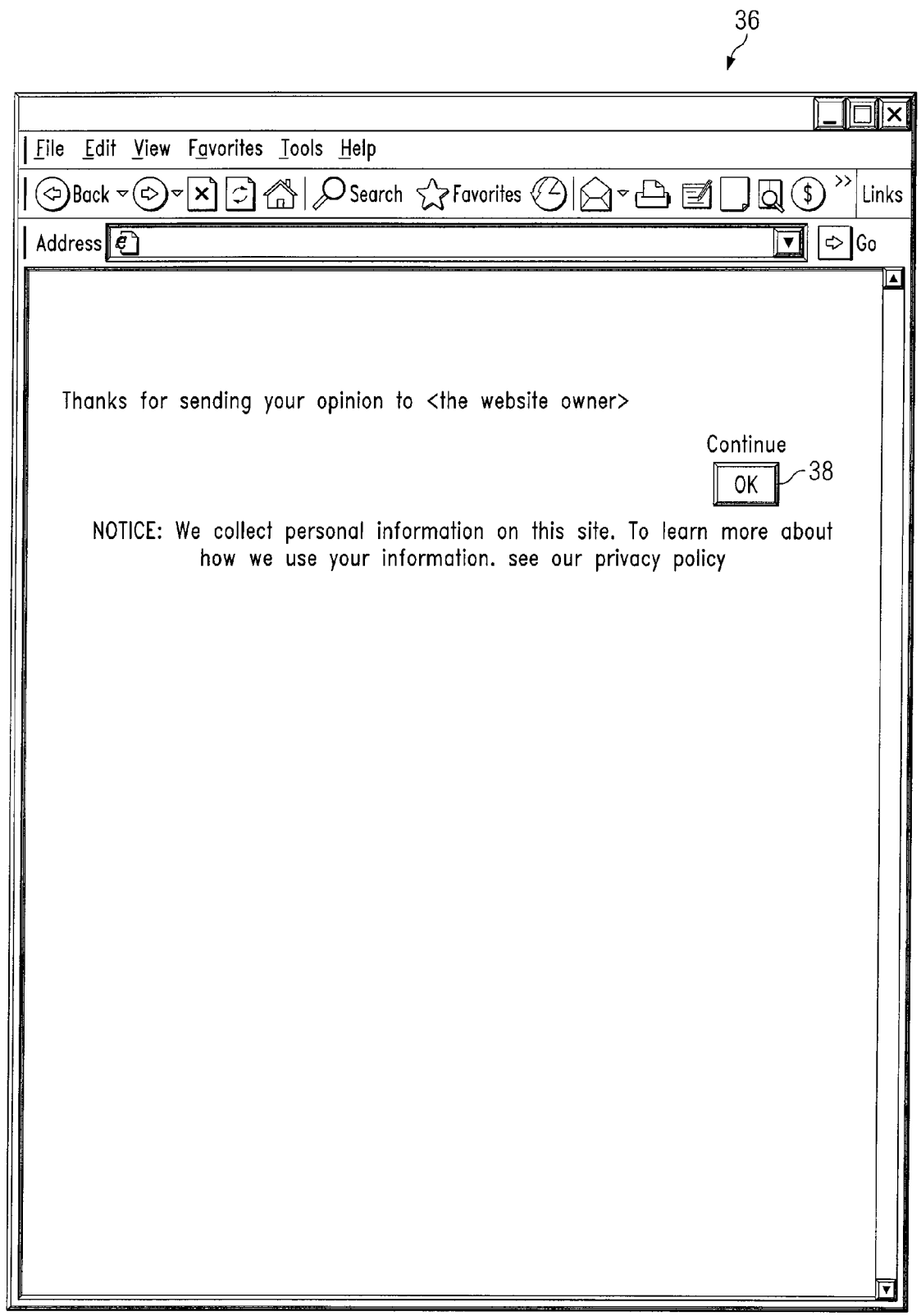

The example feedback form 30 shown in FIG. 3A includes three questions and one open-ended comment box 32. Form 30 requires the user to answer each of the questions and to provide a comment in comment box 32 before proceeding to form 34, shown in FIG. 3B. Form 34 includes five questions. Most users are required to scroll down to see all of the questions in form 34. As with form 30, form 34 also requires the user to complete the questions before continuing to form 36, shown in FIG. 3C. Form 36 does not include any questions; rather, it merely presents a message to the user. Selection of "OK" box 38 causes the window to close, allowing the user to see the original web page 10 including advertisement 12. As with form 20, forms 30 and 34 require the user to read each question and at least some of the answers to each question in order to properly provide user feedback.

The example feedback form 40 shown in FIGS. 4A-4B includes eight questions and two open-ended comment fields 42 and 44, with the fourth question having seven sub-parts. As with forms 20 and 34, form 40 also requires most users to scroll down to see all of the questions. Similarly, form 40 also requires a user to read each question and at least some of the answers to properly provide user feedback.

Figure 5:
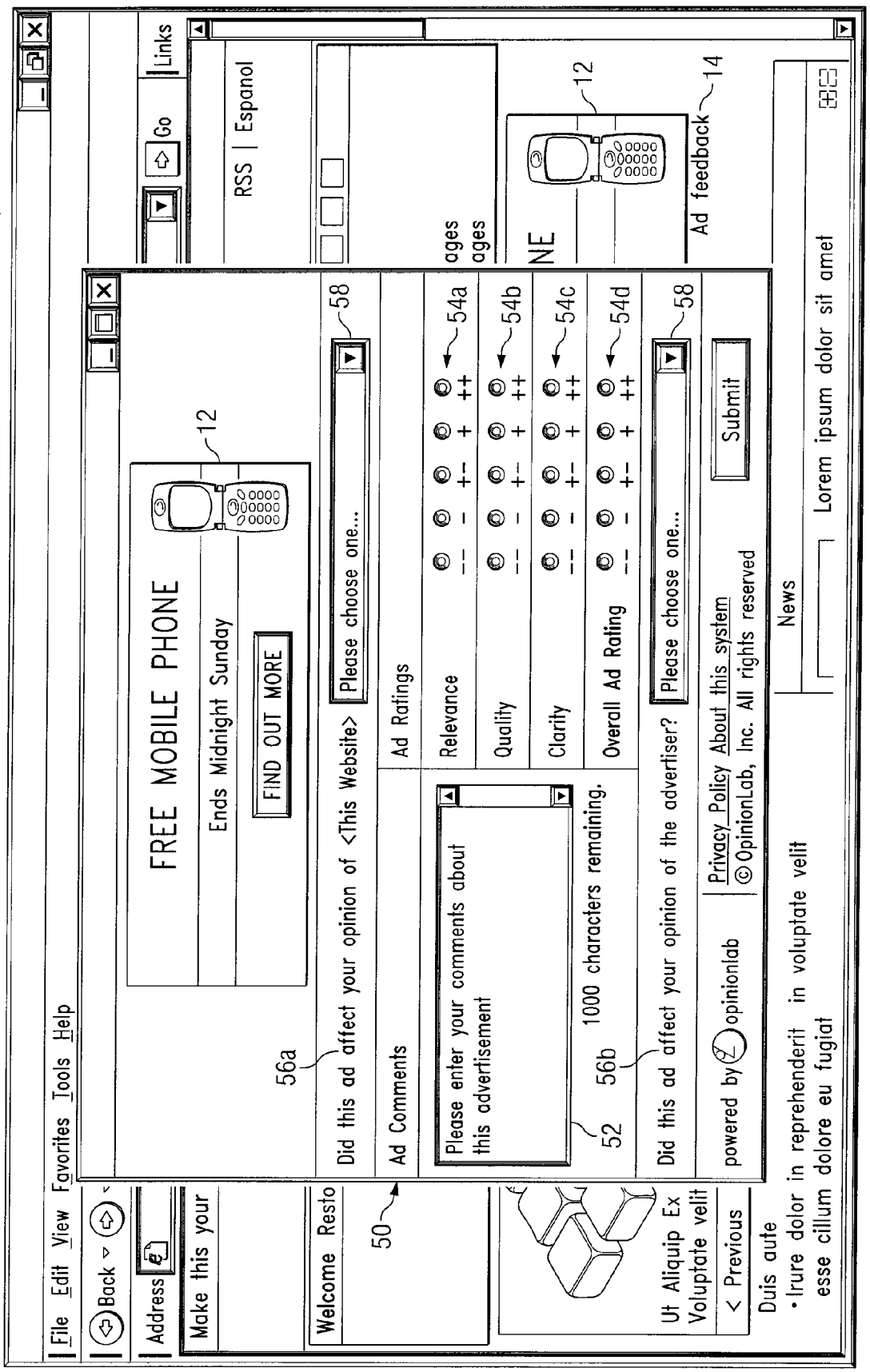
FIGS. 5 and 6 illustrate an example comment card icon.

FIG. 5 illustrates an example comment card icon 50 according to certain embodiments of the invention. In certain embodiments, comment card icon 50 may be presented in a separate window or in the same window. In embodiments, in which comment card icon 50 appears in the same window, comment card icon 50 may appear in a separate frame. As shown, the example comment card icon 50 includes advertisement 12 or a substantial duplicate thereof, so that a user can recall the features of advertisement 12 while interacting with comment card icon 50. Comment card icon 50 is compact and appears over a portion of web page 10, so that the user can still see a portion of web page 10. Comment card icon 50 includes one open-ended comment field 52, four multi-level rating scales 54a-54d, each for a different characteristic of the advertisement, and two explicit questions 56a and 56b, each with a drop-down menu 58.

In certain embodiments, this approach to presenting comment card icon 50 can be implemented using JavaScript software. In certain embodiments, the software may be included in the code of web page 10 by the owner of the website hosting advertisement 12. In certain embodiments, the software can retrieve an advertisement identifier ("AD ID") and use the AD ID to display advertisement 12 inside comment card icon 50. In certain embodiments, the AD ID and user feedback data collected using comment card icon 50 can be reported back to the website owner or other interested party in real-time. In certain embodiments, for example, real-time email alerts, email monitors or monthly tracking reports may be utilized. In alternative embodiments, reporting may be done from the page using a key command or toolbar. In certain embodiments, this data can also be shared directly with advertisers, media buyers, and/or advertisement agencies.

An example of JavaScript code for use in presenting the example comment card icon 50 is as follows:

```
<!--oobegin-->
<script language="javascript" type="text/javascript"
charset="windows-1252"
src="/onlineopinionS3t/oo_engine.js"></script>
<script type="text/javascript">oo_adurl=
dap("&PG=MSNREC&AP=1402",300,125)</script>
<div id="ad_links">
<div id="ad_link1">Advertisement</div>
    <div id="ad link2">
    <script language="javascript">O_GoT('<img
src="/onlineopinionS3t/sm_07519A_oo.gif"
border="0">Ad feedback');</script>
<script language="JavaScript">
// Custom var to track the Ad!
custom_var=escape(oo_adurl);
    </script>
    <!--ooend-->
/onlineopinionS3t/oo_engine.js file:
/* OnlineOpinion (S3t,1424b)*/
var custom_var,_sp='%3A\V\V',_rp='%3A//',_poE=0.0,
_poX=0.0,_sH=screen.height,_d=document,_w=window,_
ht=escape(_w.location.href),_hr=_d.referrer,_tm=(new
Date(   )).getTime(   ),_kp=0,_sW=screen.width;_d.
onkeypress=_fK;function
_fK(_e){if(!_e)_e=_w.event;var_k=(typeof
_e.which=='number')?_e.which:_e.keyCode;if
((_kp=15&&_k==12))_w.open('http://
www.opinionlab.com/ozone/24-
7.asp?referer='+_fC(_ht),'Report','width=370,height=200,
resizable=no,copyhistory=n
o,scrollbars=no');_kp=k};function_fC(_u){_aT=_sp+',
\V,\\,-
,_,'+_rp+',%2F,%2E,%2D,%5F';_aA=_aT.split(',');for(i=0;
i<5;i++){eval('_u=_u.repla
ce(/'+_aA[i]+'/g,_aA[i+5])')}return_u};function
O_LC(   ){_w.open('http://ccc01.opinionlab.com/comment_
card.asp?time1='+_tm+'&ti
me2='+(new
Date(   )).getTime(   )+'&prev='+_fC(escape(_hr))+
'&referer='+_fC(_ht)+'&height='+_sH
+'&width='+_sW+'&custom_var='+custom_var,'com-
ments','width=535,height=192,sc
reenX='+((sW-535)/2)+',screenY='+((_sH-192)/2)+',
top='+((_sH-
192)/2)+',left='+((_sW-
535)/2)+',resizable=yes,copyhistory=yes,scrollbars=no')};
function
_fPe(   ){if(Math.random(   )>=1.0-_poE){O_LC(   );_
poX=0.0}};function
_fPx(   ){if(Math.random(   )>=1.0-_poX)O_LC(   )};
window.onunload=_fPx;function
O_GoT(_p){_d.write('<a   href=\'javascript:O_LC(   )\
'>'+_p+'</a>');_fPe( )}
```

Figure 6:
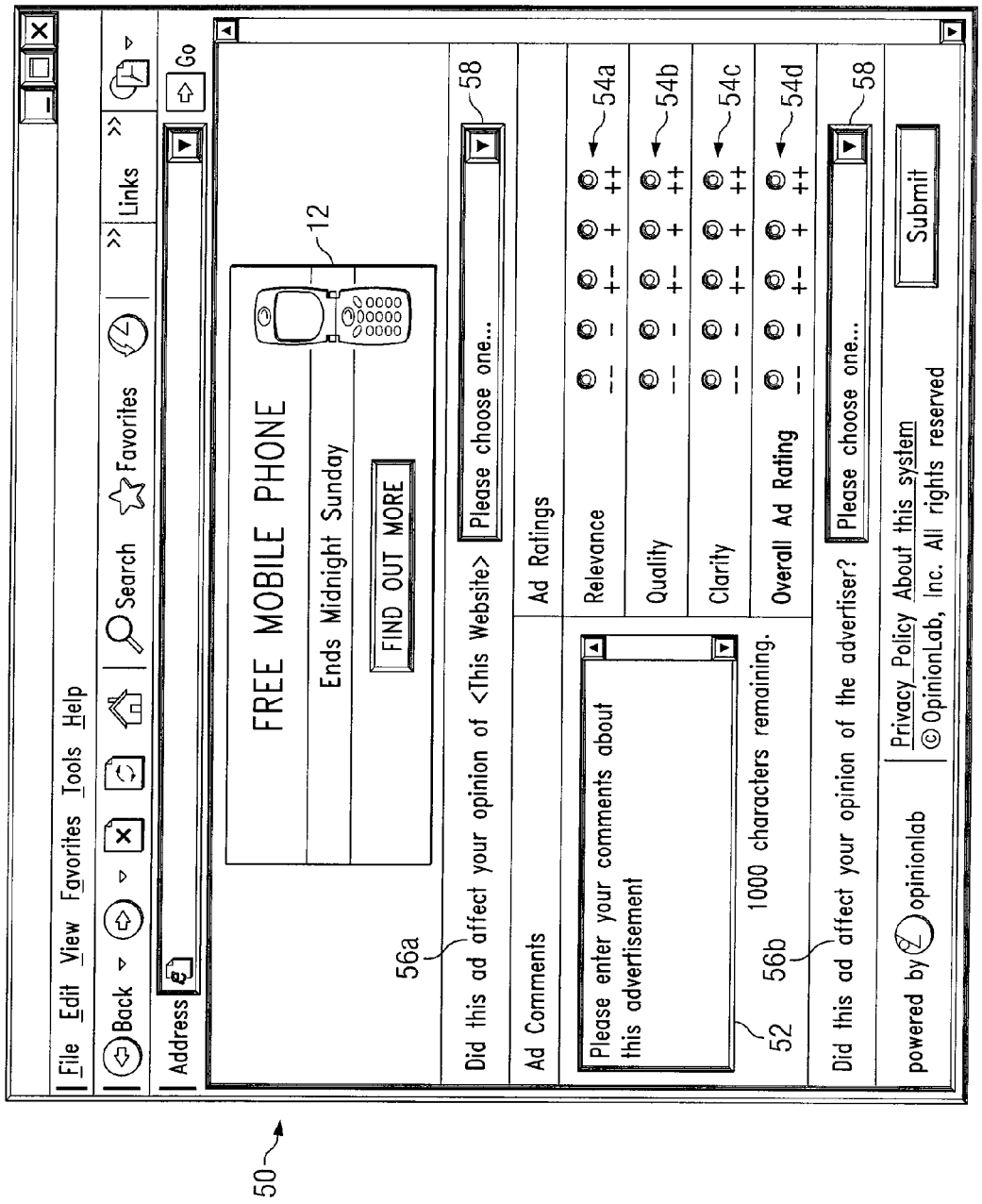

FIG. 6 illustrates an example comment card icon 50 according to certain embodiments of the invention. As shown, example comment card icon 50 includes advertisement 12 or a substantial duplicate thereof, so that a user can recall the features of advertisement 12 while interacting with comment card icon 50. Comment card icon 50 is compact and appears in a separate window. Comment card icon includes one open-ended comment field 52, four multi-level rating scales 54a-54d, each for a different characteristic of advertisement 12, and two explicit questions 56a and 56b, each with a drop-down menu 58.

In certain embodiments, this approach to presenting comment card icon 50 can be implemented without using JavaScript software. An example of code for use in presenting the comment card icon without JavaScript is as follows:

```
<a href="http://ccc01.opinionlab.com/o.asp?id=PRceBdYI
    &custom_var=adid768" alt="Click here to leave feedback
    about this ad" target="new">Ad Feedback</a>
```

Figure 7:
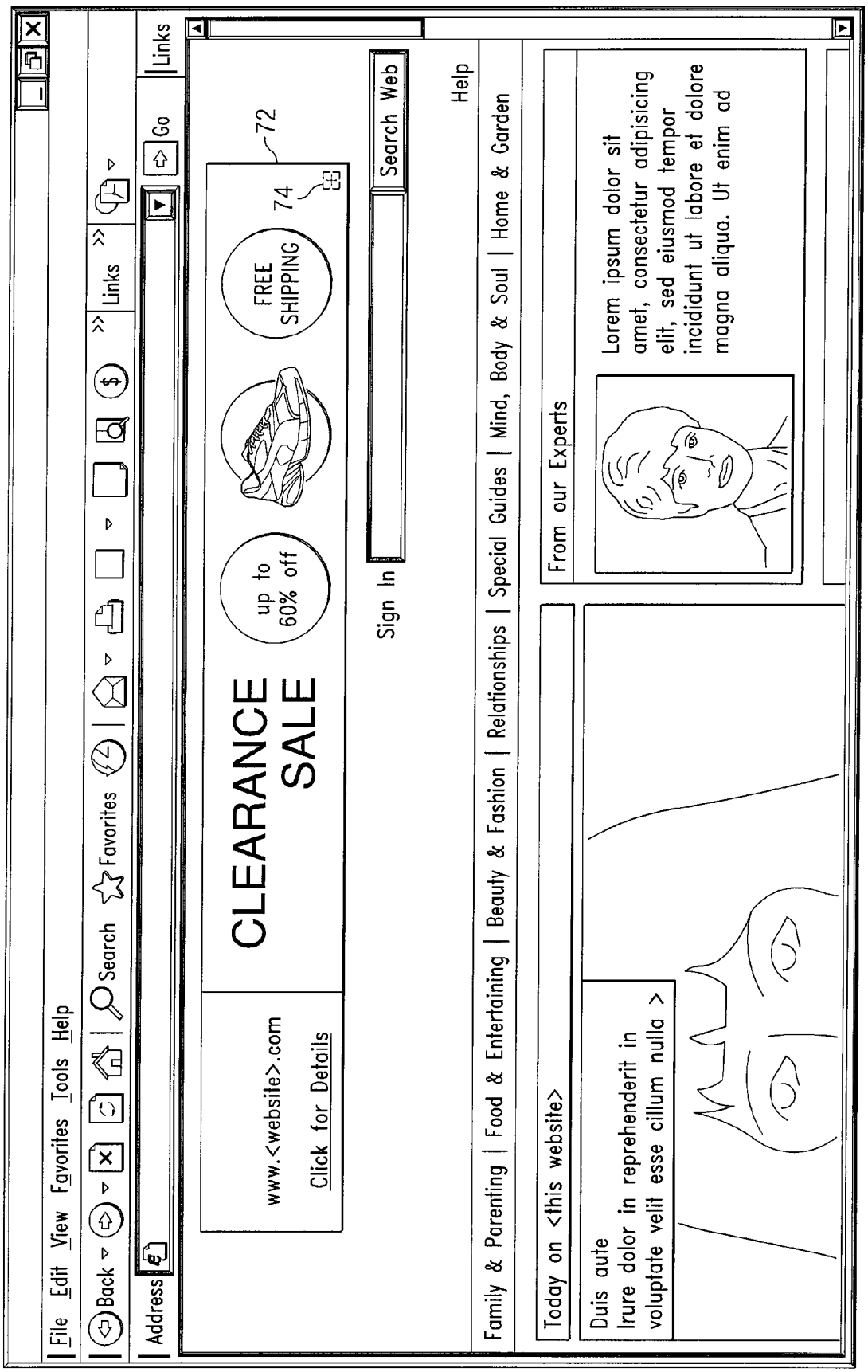
FIG. 7 illustrates an example web page with an advertisement including an embedded icon that solicits user reactions.

FIG. 7 illustrates an example web page 70 with an advertisement 72 including an embedded icon 74 that solicits user reactions. In the embodiment shown, advertisement 72 with embedded icon 74 can be a Joint Photographic Experts Group ("JPG") file, a Graphic Interchange Format ("GIF") file, and/or a Shockwave Flash ("SWF") file. In certain embodiments, client-side image-map technology may be used to link icon 74 to a comment card icon. In certain embodiments, the use of client-side image-map technology may be advantageous because of certain limitations in JPG and GIF files with respect to JavaScript, and because of the additional file size associated with JavaScript in SWF files. In certain embodiments, advertisement 72 with embedded icon 74 may utilize any appropriate format/file-type, such as for example, a Portale Network Graphics ("PNG") file or a Scalable Vector Graphics ("SVG") file.

An example of code for use in embedding icon 74 soliciting user reactions in advertisement 72 is as follows:

```
<html>
<head>
<title>Advertisement</title>
</head>
<body leftmargin="0" topmargin="0">
<img src="ad.gif" width="728" height="90" border="0"
    usemap="#ad">
<map name="ad">
<area shape="rect" alt="Click here to leave feedback about
    this    ad"    coords="714,76,722,84"    href="http://
    ccc01.opinionlab.com/o.asp?id=PRceBdYI"
    target="new">
<area shape="default" coords="0,0,727,89" href="http://
    www.onlineshoes.com/" target="new">
</map>
</body>
</html>
```

Figure 8:
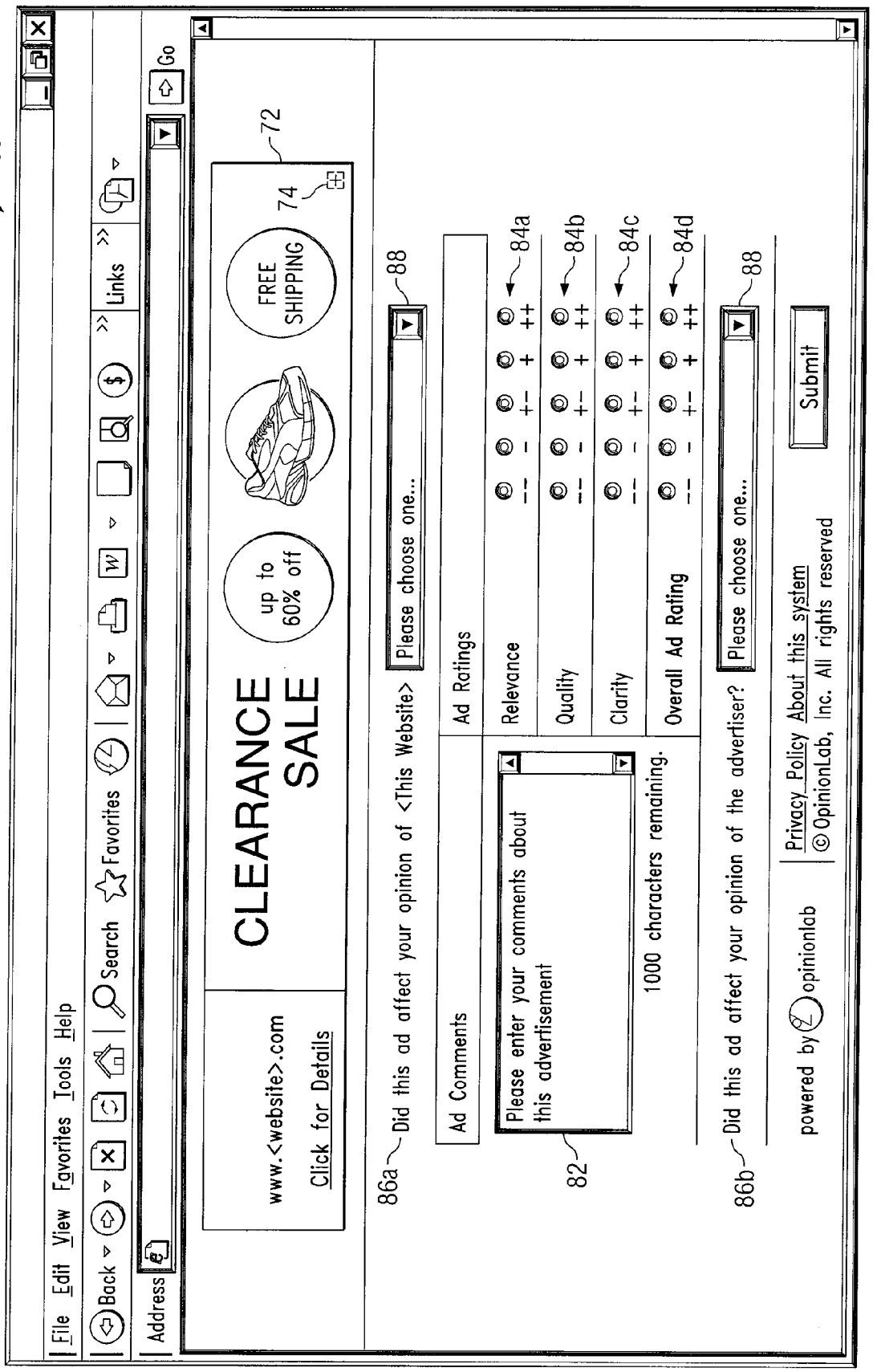
FIG. 8 illustrates an example comment card icon.

FIG. 8 illustrates an example comment card icon 80 according to certain embodiments of the invention. As shown, the example comment card icon 80 includes advertisement 72 with embedded icon 74, so that a user can recall the features of advertisement 72 while interacting with comment card icon 80. Comment card icon 80 is compact and appears in a separate window. Comment card icon 80 includes one open-ended comment field 82, four multi-level rating scales 84a-84d, each for a different characteristic of advertisement 72, and two explicit questions 86a and 86b, each with a drop-down menu 88.

In certain embodiments, in addition to collecting user reactions through the user interaction with a comment card icon, data may be collected indicating the Internet Protocol ("IP") address of the user, the web page from which a comment card icon was launched, and whether the user clicked on an advertisement prior to providing user reactions. In certain embodiments, certain data may be collected whether or not the user provided any feedback regarding an advertisement using a comment card icon.

In certain embodiments, in addition to software for collecting user reactions to one or more advertisements, software associated with a particular web page may collect user reactions to the particular web page itself. For example, in certain embodiments, the particular web page may include an icon soliciting user reactions to the particular web page (e.g., subjective ratings of the particular web page according to a multilevel rating scale). In certain embodiments, the software for collecting user reactions to the particular web page may utilize one or more features described in, for example, one or more of U.S. Pat. No. 6,421,724; U.S. Pat. No. 6,606,581; and U.S. Pat. No. 6,928,392.

Figure 9:
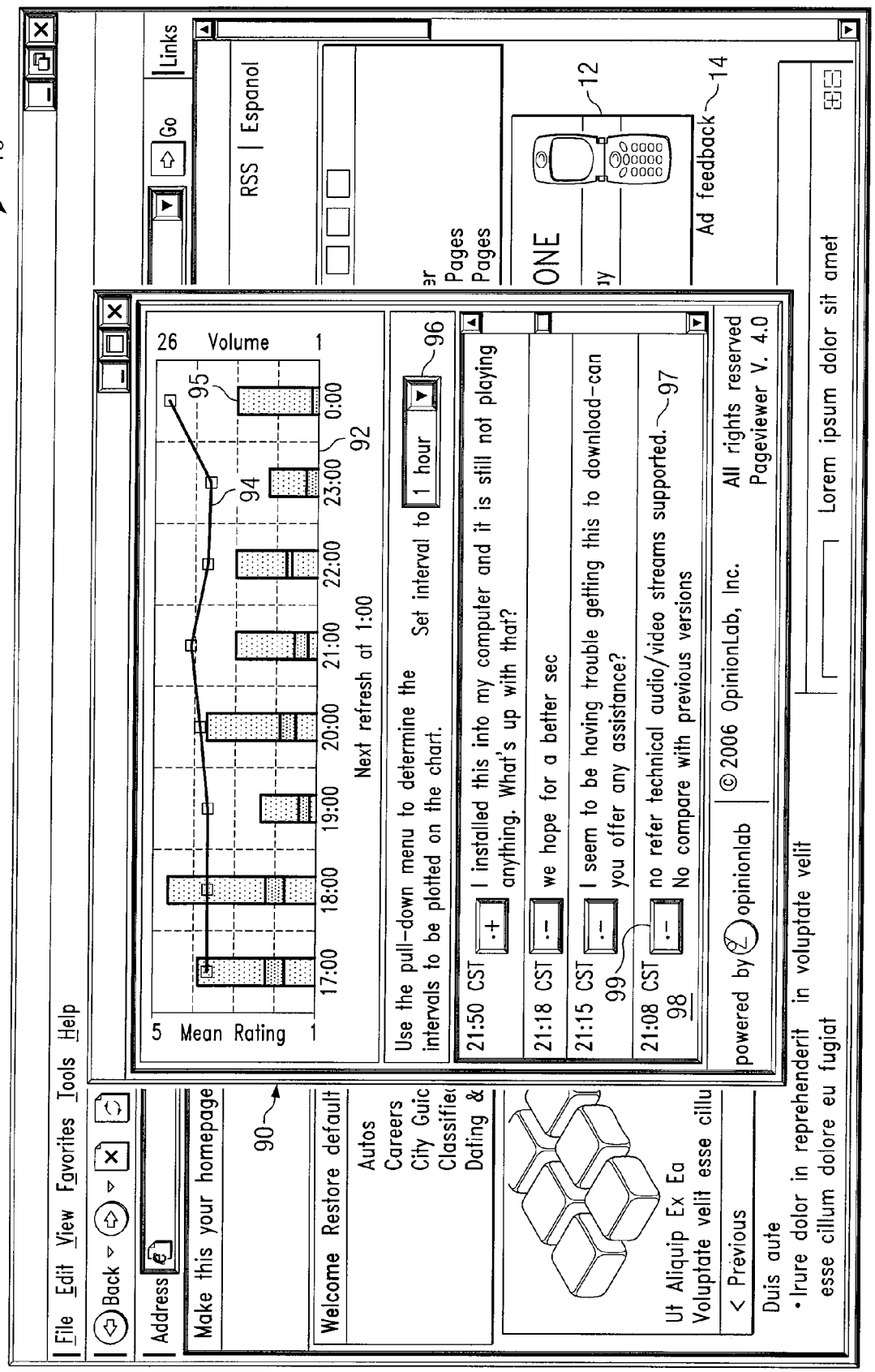
FIG. 9 illustrates an example report.

In certain embodiments, graphical tools may be utilized to display substantially real-time analysis of user reactions to one or more advertisements and/or one or more associated web pages including the advertisements. FIG. 9 illustrates an example report 90 including a graph 92 showing user reactions over time to both the web page (e.g., indicated by line segments 94 on graph 92) and to one or more advertisements included on the web page (indicated by bars 95 on the graph 92). The vertical axis for line segments 94 is the mean rating of web page 10. The vertical axis for bars 95 on graph 92 is the volume of user reactions to one or more advertisements. For both line segments 94 and bars 95, the horizontal axis is broken down into time intervals of one hour each. In certain embodiments, a user can customize the information provided in graph 92 by, for example, changing the time intervals using a drop down menu 96 or other tool. In graph 92, bars 95 may be color-coded to show the volume of different types of user reactions. For example, user reactions can be color-coded based on positive, negative, or neutral responses. In a particular embodiment, positive responses may be indicated using green, neutral responses may be indicated using yellow or black, and negative responses may be indicated using red. Report 90 also includes a list of user comments 97, with a time stamp 98, and an indicator 99 of the type of response. In certain embodiments, user comments 97 may also be color-coded. Similarly, in certain embodiments, the list of user comments 97 can be customized by filtering the list based on response type, time, or other criteria. In certain embodiments, user comments 97 may be keyword searchable and may be filtered based on key words. In certain embodiments, a report such as report 90 may be displayed while an authorized user (such as the website owner) is viewing the particular web page that includes the advertisement. For example, report 90 may be displayed in response to an authorized user selecting icon 14 soliciting user feedback. As another example, report 90 may be displayed in response to the authorized user selecting a browser menu item or typing a hotkey. In certain embodiments, report 90 provides substantially real-time information regarding user reactions to one or more advertisements.

Figure 10:
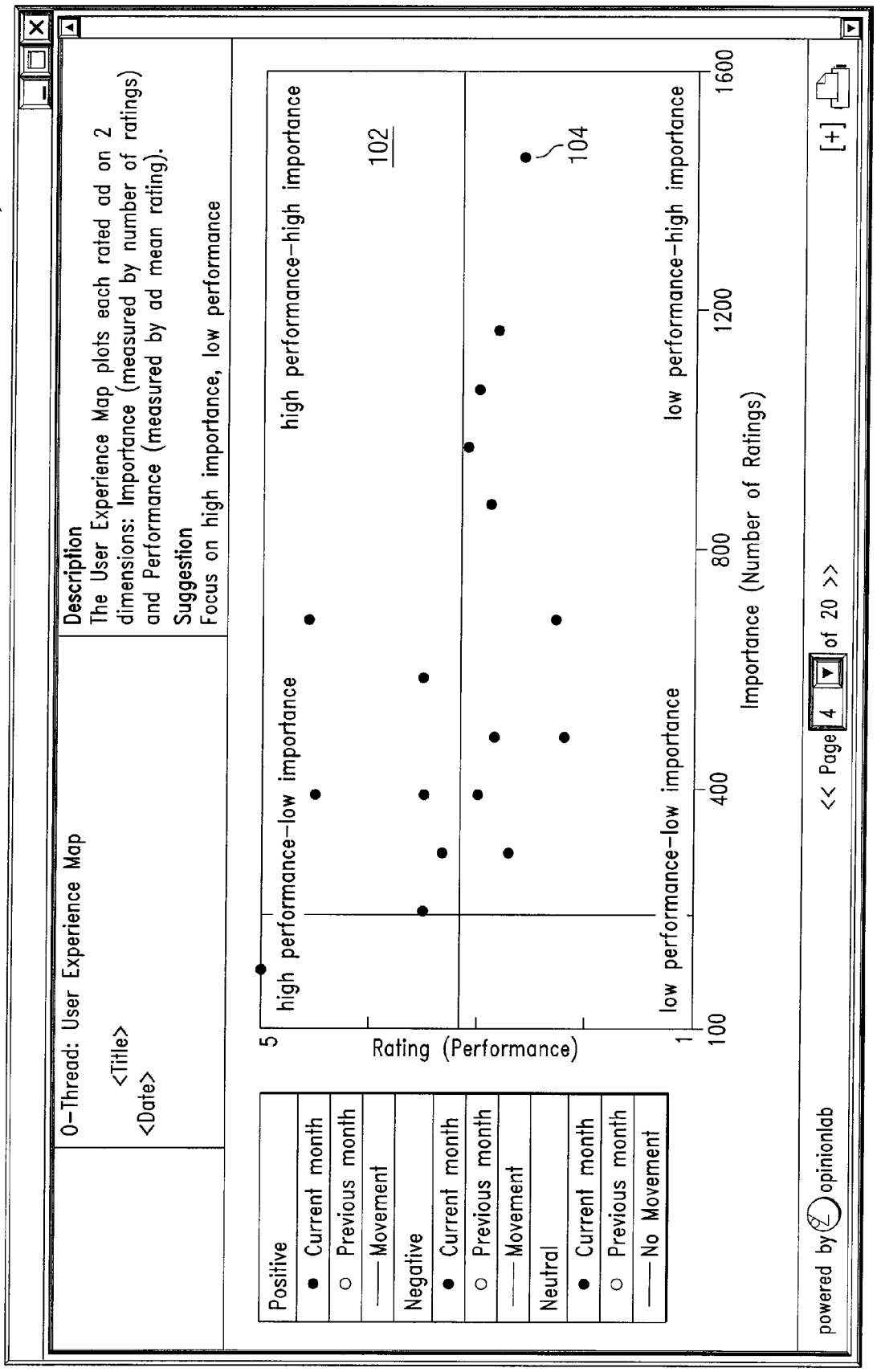
FIG. 10 illustrates an example graphical tool.

In certain embodiments, graphical tools can be utilized to display comparisons of user reactions to multiple advertisements. FIG. 10 illustrates an example embodiment of a graphical tool 100 for comparing user reactions to multiple advertisements. In the embodiment shown, graphical tool 100 includes a scatter-plot 102 with the horizontal axis representing the volume of user reactions to particular advertisements and the vertical axis representing a quantitative value associated with the user reactions to particular advertisements. For example, the vertical axis may represent a value associated with whether, on average, user reactions have been positive, negative, or neutral. In scatter-plot 102, each point 104 or other icon on scatter-plot 102 may represent a particular advertisement. In certain embodiments, authorized users can access this or a similar report and can quickly evaluate the relative performance of one or more particular advertisements. In certain embodiments, placing a cursor over a point 104 or other icon in scatter-plot 102 may cause an information flag to appear indicating the name of or an identifier for the particular advertisement. In certain embodiments, clicking on a point 104 or other icon in scatter-plot 102 may cause a pop-up window to appear that provides additional details regarding the user reaction data for the particular advertisement. In a particular embodiment, the pop-up window may include some or all of the information from report 90, shown in FIG. 9.

Figure 11:
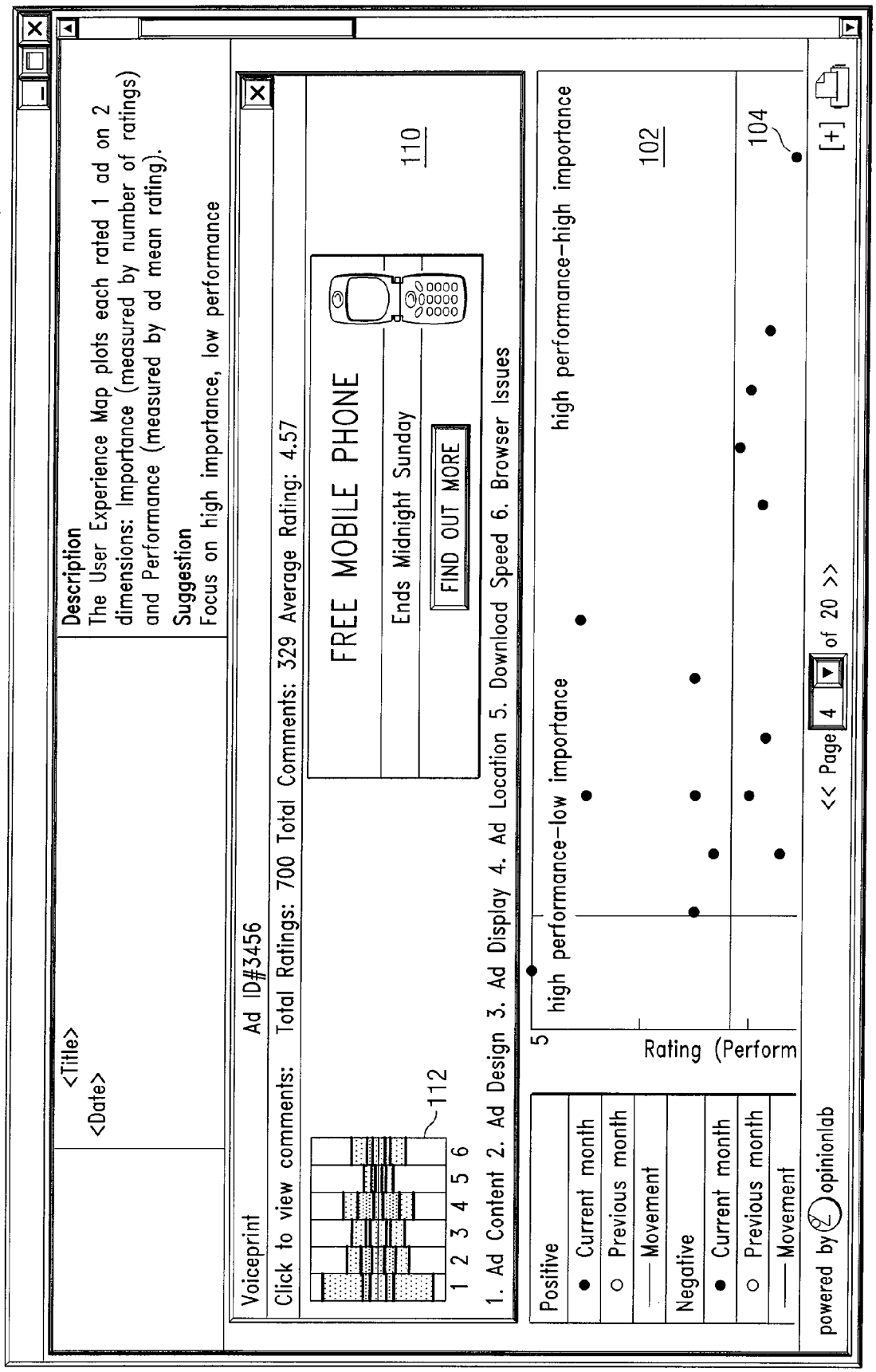
FIG. 11 illustrates an example display.

In certain embodiments, selecting one of the points or other icons in scatter-plot 102 may cause display 110, shown in FIG. 11, to be presented. Display 110 includes the advertisement associated with the point 104 or other icon in scatter-plot 102 and visual elements providing more detailed analysis of the user reactions to the advertisement. In certain embodiments, the visual elements may include color-coded bar graph 112. In certain embodiments, each color may represent whether user reactions have been positive, negative, or neutral. In certain embodiments, each bar may represent a certain characteristic of the advertisement, such as content, design, display location, download speed, browser issues, relevance, quality, clarity, and overall advertisement rating. In a particular embodiment, the visual elements may include a mirror-image graph, such that the graph includes a first half and a second half, the first half being separated from the second half by an axis of the graph and the first half being a mirror-image of the second half.

Figure 12:
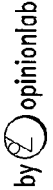
FIG. 12 illustrates an example report.

FIG. 12 illustrates an example report 120 that may be provided for user reactions to a particular advertisement. In the embodiment shown, report 120 provides a listing of user comments 122, together with advertisement characteristics or identifier 124, user reaction ratings 126, and the date and time that each user comment was received. In certain embodiments, report 120 may also include information related to the web page that included the advertisement and/or information related to the user that provided the user reaction. In certain embodiments, the report may be customizable using one or more filters, sorting tools, etc. In certain embodiments, software for use in reporting user reactions may utilize features described in, for example, one or more of U.S. Pat. No. 6,421,724; U.S. Pat. No. 6,606,581; and U.S. Pat. No. 6,928,392.

In certain embodiments, one or more of the tools described herein may be used to evaluate positive and/or negative brand equity for particular advertisements. In certain embodiments, one or more of these tools may be used to determine and/or evaluate the impact that particular websites have on the efficacy of particular advertising campaigns. In certain embodiments, one or more of these tools may be used to determine and/or evaluate the positive or negative impact that a particular advertising campaign may have on the brand equity associated with a particular website or website owner. In certain embodiments, one or more of these tools may be utilized to provide real-time or substantially real-time information regarding user reactions to one or more websites, web pages, advertisements, and/or combinations thereof.

In certain embodiments, one or more of the tools described herein may be utilized to supplement, fine tune, and/or replace existing market and/or advertising research methods and services. For example, existing market and/or advertising research methods may be fine tuned through the addition of substantially real time information regarding positive and/or negative user reactions to particular advertisements on particular web pages.

Although the present invention has been described with several embodiments, a plenitude of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for measuring user reactions to a particular advertisement on a web page, comprising:
a processor configured to:
generate a display of a web page comprising:
a particular advertisement;
a first portion comprising information separate from the particular advertisement; and
a first element that, upon initial display of the web page, is viewable on the web page on or near the particular advertisement included on the web page;
generate, in response to user selection of the first element, a second element that solicits one or more advertisement-specific user reactions concerning the particular advertisement included on the web page, wherein:
the second element is distinct from the web page; and
the second element comprises a substantial duplicate of the particular advertisement but not the first portion; and
a memory coupled to the processor and operable to store:
software associated with the first element and when executed by the processor, is operable to receive the user selection of the first element and initiate display of the second element in response; and
software associated with the second element and when executed by the processor, is operable to receive the advertisement-specific user reactions concerning the particular advertisement included on the web page for reporting to an interested party, the advertisement-specific user reactions allowing the interested party to access one or more components of the advertisement-specific user reactions.

2. The system of claim 1, wherein the first element is embedded in the particular advertisement on the web page.

3. The system of claim 1, wherein the first element comprises a plus-sign.

4. The system of claim 1, wherein the first element appears identically and behaves consistently on each of a plurality of other web pages associated with the web page including the particular advertisement.

5. The system of claim 1, wherein the software associated with the first element comprises JavaScript.

6. The system of claim 1, wherein the advertisement-specific user reactions comprise one or more multi-level subjective ratings of the particular advertisement.

7. The system of claim 1, wherein the advertisement-specific user reactions comprise one or more advertisement-specific open-ended comments concerning the particular advertisement.

8. The system of claim 1, wherein the advertisement-specific user reactions comprise one or more advertisement-specific subjective ratings of the particular advertisement and one or more associated advertisement-specific open-ended comments concerning the particular advertisement.

9. A method for reporting user reactions to a particular advertisement included on a web page, comprising:
collecting, by a computer, advertisement-specific user reactions concerning a particular advertisement included on a web page, the web page comprising:
the particular advertisement;
a first portion comprising information separate from the particular advertisement; and
a first element that, upon initial display of the web page, is viewable on the web page on or near the particular advertisement included on the web page;
generating, in response to user selection of the first element, a second element, that solicits one or more advertisement-specific user reactions concerning the particular advertisement included on the web page, wherein:
the second element is distinct from the web page; and
the second element comprises a substantial duplicate of the particular advertisement but not the first portion; and
presenting, by the computer, an electronic report of the advertisement-specific user reactions concerning the particular advertisement included on the web page, the electronic report comprising a color-coded bar graph comprising a plurality of color coded bars, each bar representing a particular characteristic of the particular advertisement included on the web page, each color within a bar representing a particular rating associated with the user reactions for the particular characteristic.

10. The method of claim 9, wherein the particular characteristics comprise a content, a design, and a display location of the particular advertisement.

11. The method of claim 10, wherein a color green represents a positive rating; and a color red represents a negative rating.

12. The method of claim 9, wherein the color-coded bar graph comprises a first half and a second half, wherein the first half is separated from the second half by an axis of the color-coded bar graph, and wherein the second half is a mirror-image of the first half.

13. The method of claim 9, wherein the advertisement-specific user reactions comprise one or more multi-level subjective ratings of the particular advertisement.

14. The method of claim 9, wherein the advertisement-specific user reactions comprise open-ended comments.

15. The method of claim 9, wherein the advertisement-specific user reactions comprise one or more advertisement-specific subjective ratings of the particular advertisement and one or more associated advertisement-specific open-ended comments concerning the particular advertisement.

16. A method for reporting user-reactions to a plurality of advertisements included on one or more web pages, comprising:
collecting, by a computer, advertisement-specific user reactions concerning a plurality of advertisements included on one or more web pages, the advertisement-specific user reactions concerning at least one characteristic of the plurality of advertisements, each web page comprising:
an advertisement from the plurality of advertisements;
a first portion comprising information separate from the advertisement; and
a first element that, upon initial display of the web page, is viewable on the web page on or near the advertisement included on the web page;
generating, in response to user selection of the first element, a second element, that solicits one or more advertisement-specific user reactions concerning the advertisement included on the web page, wherein:
the second element is distinct from the web page; and
the second element comprises a substantial duplicate of the advertisement but not the first portion; and
presenting, by the computer, an electronic report for the advertisement-specific user reactions concerning the at least one characteristic of the plurality of advertisements included on the one or more web pages, the electronic report comprising a multi-dimensional graph comprising:
- a plurality of icons, each icon representing a particular advertisement within the plurality of advertisements;
- a first axis corresponding to a quantity of user reactions associated with each of the plurality of advertisements; and
- a second axis corresponding to ratings associated with user reactions for the at least one characteristic of the plurality of advertisements.

17. The method of claim 16, wherein each of the plurality of icons is color-coded.

18. The method of claim 16, wherein the at least one characteristic includes one of: a content, a design, and a display location of the plurality of advertisements.

19. The method of claim 16, wherein the advertisement-specific user reactions comprise one or more multi-level subjective ratings of the plurality of advertisements.

20. The method of claim 16, wherein the advertisement-specific user reactions comprise advertisement-specific subjective ratings of the plurality of advertisements and associated advertisement-specific open-ended comments concerning the plurality of advertisements.

\* \* \* \* \*